United States Patent
Zhang et al.

(10) Patent No.: US 10,069,938 B1
(45) Date of Patent: Sep. 4, 2018

(54) RETURNING IDENTIFIERS IN DEFAULT QUERY RESPONSES

(71) Applicant: EMC Corporation, Hopkinton, MA (US)

(72) Inventors: Jichao Zhang, Shanghai (CN); James Pendergraft, Raleigh, NC (US); Wei Wang, Hopkinton, MA (US); Meiling Ge, Shanghai (CN); Jun Peng, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 222 days.

(21) Appl. No.: 14/673,618

(22) Filed: Mar. 30, 2015

(51) Int. Cl.
*G06F 15/16* (2006.01)
*H04L 29/06* (2006.01)

(52) U.S. Cl.
CPC ................... *H04L 67/42* (2013.01)

(58) Field of Classification Search
CPC ....................................... H04L 67/42
See application file for complete search history.

(56) References Cited

U.S. PATENT DOCUMENTS

| | | | | |
|---|---|---|---|---|
| 8,745,641 B1* | 6/2014 | Coker | ................. | G06F 11/3668 719/313 |
| 8,972,489 B2* | 3/2015 | Gregorio | ................... | G06F 8/30 709/201 |
| 9,098,326 B1* | 8/2015 | Martin | ..................... | G06N 5/04 |
| 9,184,980 B1* | 11/2015 | Aman | ............... | G06F 17/30958 |
| 2008/0016143 A1* | 1/2008 | Bumpus | .............. | H04L 41/0226 709/203 |
| 2009/0006523 A1* | 1/2009 | Kordun | ............... | G06F 17/3089 709/202 |
| 2009/0024590 A1* | 1/2009 | Sturge | ................ | G06F 17/30893 |
| 2009/0235349 A1* | 9/2009 | Lai | ........................ | H04L 9/3213 726/14 |
| 2009/0276771 A1* | 11/2009 | Nickolov | .............. | G06F 9/4856 717/177 |
| 2010/0281364 A1* | 11/2010 | Sidman | ............. | G06F 17/30595 715/713 |

(Continued)

FOREIGN PATENT DOCUMENTS

EP    2608487 A1    6/2013

OTHER PUBLICATIONS

James, Paul, "A RESTful Web service, an example", Retrieved at <<http://www.peej.co.uk/articles/restfully-delicious. Feb. 5, 2015, 11 pages.

*Primary Examiner* — Ario Etienne
*Assistant Examiner* — Blake J Rubin
(74) *Attorney, Agent, or Firm* — BainwoodHuang (57) ABSTRACT

Examples are generally directed towards managing query responses. A server receives an unspecified property request associated with a resource. The request identifies a resource and omits a property field parameter. A set of instances associated with the resource is identified. An identifier for each instance in the set of instances is identified to form a set of identifiers. The server returns only the set of identifiers to the client as a response to the unspecified property request. On determining the server has received a types-feed request from the client, the server identifies all possible property types for the resource to form a list of all property types. The server returns the list of all property types to the client as a response to the types-feed request.

20 Claims, 8 Drawing Sheets

(56) References Cited

U.S. PATENT DOCUMENTS

| | | | | |
|---|---|---|---|---|
| 2011/0078678 | A1* | 3/2011 | Matthews | G06F 9/445 717/178 |
| 2012/0054594 | A1* | 3/2012 | Isaacson | G06F 17/30058 715/230 |
| 2012/0066178 | A1* | 3/2012 | Omansky | G06F 17/5004 707/626 |
| 2012/0179503 | A1* | 7/2012 | Chalana | G06Q 10/06 705/7.14 |
| 2012/0254111 | A1* | 10/2012 | Carmichael | G06F 17/30094 707/627 |
| 2012/0317028 | A1* | 12/2012 | Ansari | G06Q 20/28 705/44 |
| 2012/0324034 | A1* | 12/2012 | Burkhardt | G06F 17/30876 709/212 |
| 2013/0019000 | A1* | 1/2013 | Markus | G06F 9/466 709/223 |
| 2013/0072160 | A1* | 3/2013 | Lawson | H04L 63/102 455/411 |
| 2013/0152047 | A1* | 6/2013 | Moorthi | G06F 11/368 717/124 |
| 2013/0246944 | A1* | 9/2013 | Pandiyan | G06F 9/54 715/760 |
| 2013/0347094 | A1* | 12/2013 | Bettini | H04L 63/0245 726/11 |
| 2014/0059385 | A1* | 2/2014 | Dolinsky | H04L 41/0856 714/33 |
| 2014/0108450 | A1* | 4/2014 | Howes | H04L 43/0811 707/770 |
| 2014/0156726 | A1* | 6/2014 | Bohlmann | H04L 69/18 709/203 |
| 2014/0181826 | A1* | 6/2014 | Wolf | G06F 9/4843 718/102 |
| 2014/0195651 | A1* | 7/2014 | Stockhammer | H04N 21/23439 709/219 |
| 2014/0344340 | A1* | 11/2014 | Tang | H04L 67/2823 709/203 |
| 2014/0359133 | A1* | 12/2014 | Tian | H04L 47/72 709/226 |
| 2014/0359389 | A1* | 12/2014 | Seastrom | H04N 21/23608 714/751 |
| 2014/0372970 | A1* | 12/2014 | Broussard | G06F 9/541 717/106 |
| 2015/0074743 | A1* | 3/2015 | Ilieva | H04L 63/20 726/1 |
| 2015/0083798 | A1* | 3/2015 | Trifa | G06F 17/30879 235/375 |
| 2015/0095303 | A1* | 4/2015 | Sonmez | G06N 5/003 707/707 |
| 2015/0120729 | A1* | 4/2015 | Slade | H04W 4/001 707/736 |
| 2015/0128103 | A1* | 5/2015 | Stratton | G06F 8/00 717/100 |
| 2015/0131444 | A1* | 5/2015 | Malatack | H04M 7/0021 370/235 |
| 2015/0248277 | A1* | 9/2015 | Sabbouh | G06F 8/10 717/104 |
| 2015/0262528 | A1* | 9/2015 | Takahara | G09G 3/3225 345/212 |
| 2015/0264134 | A1* | 9/2015 | Dong | H04L 67/16 709/204 |
| 2015/0281018 | A1* | 10/2015 | Britt | G06F 17/30477 707/769 |
| 2015/0304459 | A1* | 10/2015 | Pakula | H04L 67/02 709/203 |
| 2015/0347541 | A1* | 12/2015 | Holmes | G06F 17/30563 707/602 |
| 2015/0363484 | A1* | 12/2015 | Kamath | G06F 17/30997 707/751 |
| 2015/0373097 | A1* | 12/2015 | Konkus | H04L 67/1025 709/203 |
| 2016/0004767 | A1* | 1/2016 | Song | G06F 17/30861 707/769 |
| 2016/0078361 | A1* | 3/2016 | Brueckner | G06N 99/005 706/12 |
| 2016/0080493 | A1* | 3/2016 | Roth | G06F 9/45529 709/203 |
| 2016/0092173 | A1* | 3/2016 | Rodrigues | G06F 8/30 717/106 |
| 2016/0092590 | A1* | 3/2016 | Song | G06F 17/30896 715/234 |
| 2016/0149986 | A1* | 5/2016 | Ding | H04L 67/02 709/217 |
| 2016/0157113 | A1* | 6/2016 | Row, II | H04W 84/18 370/252 |
| 2016/0283203 | A1* | 9/2016 | Li | G06F 8/38 |
| 2017/0093635 | A1* | 3/2017 | Sen | H04L 67/1097 |

\* cited by examiner

```
                              600                              602
                                                              ⌒
GET https://10.108.53.149/api/types/user/instances?fields=name,role
                                                    604⌣    ⌣606
```

FIG. 6

```
gentryCounth:2,
gentriesh: [                    506
                              ⌒⌒⌒
        ⎡{"content":  {"id":"user_admin",
  702  ⎨       704           706
        ⎣  ⌒⌒⌒      ⌒⌒⌒⌒⌒                                    700
           "name":"admin","role":"administrator"} },
                               508
                              ⌒⌒⌒
        ⎡{"content":  {"id":"user_abc",
  708  ⎨       710           712
        ⎣  ⌒⌒⌒      ⌒⌒⌒⌒
           "name":"abc","role":"operator"} }
]
```

FIG. 7

```
                          800                              802
GET https://10.108.53.149/api/types/user?fields=attributes
```

FIG. 8

```
"attributes":[                                    900
      { "name": "id",
902     "type": "String",
        "description": "Unique identifier of the user instance. " }, { "name": "name",
904     "type": "String",
        "description": "Name of the user. " }, { "name": "role",
906     "type": "role",
        "description": "User role as defined by the role resource type. " }
    ],
```

RETURNING IDENTIFIERS IN DEFAULT QUERY RESPONSES

BACKGROUND

A representational state transfer (REST) application programming interface (API) is a software architecture style associated with a client-server model. REST APIs typically utilize hypertext transfer protocol (HTTP) to send requests between clients and servers using HTTP verbs such as, GET, POST, PUT, and DELETE. These HTTP verbs may be used by clients in requests to read data, post data, delete data, and update data to a server. A request may also be referred to as a query.

A REST request from a client generally contains all the information necessary for a server to service the request. In other words, the information needed by the server to handle the request is contained within the request itself, whether as part of a uniform resource identifier (URI), query-string parameters, body, or headers of the REST request. A client may send a REST request to get properties of one or more instances of an object from a server.

Generally, a REST request to get data identifies a particular resource. REST requests normally return the full state of the requested resource. In other words, the request returns the value of every property associated with the requested resource. This can be very large in some cases, because some resources may have a large number of properties. Some or all of these properties may have large or complex values.

The response size issue is aggravated when a collection of many instances is requested. Some REST APIs allow the client to limit the set of properties returned for each instance by specifying a list of desired properties.

SUMMARY

Examples of the disclosure provide for request processing. In an example, a computer-implemented method for managing queries is provided. A request associated with a resource is processed by at least one processing device. The request omits a property field parameter. The server identifies a default identifier property of each instance in a set of instances associated with the resource to form a set of identifiers. The server generates a response to the request. The response includes the set of identifiers. The response excludes all properties of the set of instances except the default identifier property.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWING

Corresponding reference characters indicate corresponding parts throughout the drawings.

DETAILED DESCRIPTION

Current representational state transfer (REST) application programming interface (API) default response to a request that identifies a resource but omits any fields is to return all available properties for the resource. A resource may be associated with a large number of properties and references to other objects. In such cases, the REST API default response may return hundreds of properties in response to a single RES request from a single client. Some or all of those returned properties may be large and complex values with other properties nested inside them. This default response may result in unnecessary consumption of computer memory, computer resources, and network bandwidth for both the client and the server involved.

Examples of the disclosure enable an unspecified property component for generating query responses. A query may also be referred to as a request.

In some examples, the server processes an unspecified property request associated with a resource that is received from a client. The server identifies a set of instances associated with the resource. The set of instances includes one or more instances of the resource. The server identifies a default identifier property of each instance in the set of instances to form a set of identifiers. The set of identifiers includes one or more identifiers. The server returns only the set of identifiers to the client in response to the unspecified property request. The server does not return any other properties associated with the resource to the client.

In other examples, the server only returns the set of identifiers to a client in response to an unspecified property request. If a client wants to receive more than the set of identifiers, the user specifies the desired property in a property field parameter of the query. When the server receives a query that includes one or more desired properties in the property field parameter, the server returns those properties in addition to the set of instances. Thus, the server only returns properties that are specifically requested. In this manner, the server uses property field parameters within a request to expand the amount of data returned to the client by the server.

Other examples provide a types-feed component for processing types-feed queries. If a user desired a list of possible properties that may be requested by the user in a property field parameter of a query, the user may request the available properties using a types-feed query. The types-feed component generates a list of all property types associated with a resource associated with the types-feed request. The types-feed component returns the list of all properties associated with the resource in response to the types-feed request.

The unspecified property component reduces the number of properties returned to clients in response to queries. This unspecified property component increases speed, improves performance, reduces processor load, reduces network bandwidth usage, conserves memory, improves input/output operations, reduces latency, and improves performance of both the server and the client.

The return identifier only response to unspecified field requests saves storage system central processing unit (CPU) time and memory. This default return identifier only response also saves network bandwidth by limiting the number of properties returned in response to each client request. This feature makes the API more scalable. In such design, every request needs less CPU and memory resource, so the application server that hosts the REST API can handle more requests.

The unspecified property component also improves client backward compatibility because changes to one or more properties associated with a resource that are not specifically identified in a client request will not affect the request. Likewise, changes to a property that is specifically requested in a property field parameter of a request, such as a requested property that is no longer available, will result in an immediate failure returned to the client. This provides the user with an immediate error instead of silently omitting the obsolete property values.

Moreover, aspects of the disclosure requiring a user to specifically request a desired property in a request to the server requires the client code to explicitly document which properties of which instances and/or resources are being used, changed, deleted, or otherwise altered by the client. The documentation aspect is in the source code in the development environment.

The code base is easier to maintain because all dependencies are explicitly documented in the queries. This explicit documentation in the queries also avoids unintentional dependencies. For example, if changes are made to the server, a user interested in a given object only has to check the queries to determine if any user has asked for the given object instead of having to read all the code for the entire client to determine if something has been done to alter the given object. This is possible because all users are required to specifically request a property and/or object.

The types-feed component enables a quick and efficient method by which a user may obtain a list of all available properties for utilization in generating API queries associated with a particular resource. This encourages users to utilize supported fields in a current version of a resource which saves memory, improves performance of the input/output operation, and improves compatibility between different API versions.

Other aspects of the disclosure improve user experience of calling REST API by shortening query response time, improving user interaction performance, returning only desired properties to the user, and improving user efficiency by minimizing the number of unwanted properties returned to the user in each query response the user receives from a server. The response time is shorter because the load in response only contains the required properties needed by the user.

Figure 1:
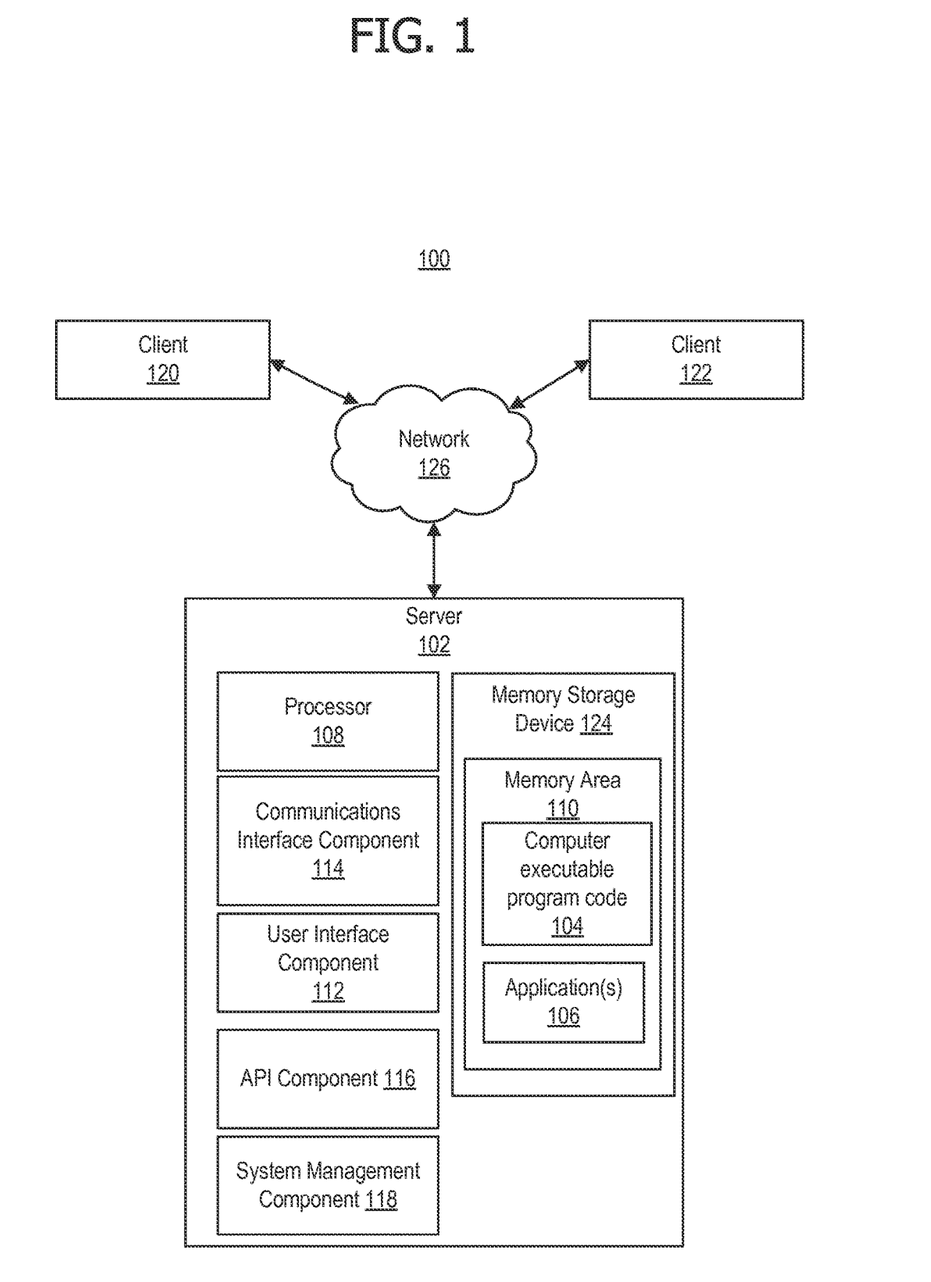
FIG. 1 is an exemplary block diagram illustrating a system for responding to queries.

Referring again to FIG. 1, an exemplary block diagram illustrates a system 100 for client-server queries and query responses. In the example of FIG. 1, the data processing system represents a system for responding to REST API queries received from one or more clients. In this non-limiting example, system 100 includes a server-client network. However, aspects of the disclosure are not limited to networked systems.

The server 102 is a computing device executing computer executable program code 104 (e.g., as application(s) 106, operating system functionality, or both) to implement the operations and functionality associated with the server 102. The server 102 may include a web server, an application server, a file server, a back-end server, a cloud server, or any other type of server. In another example, the server 102 is a server associated with a data storage system. In still another example, the server 102 may be any type of computing device for request processing. In yet another example, server 102 may represent a group of processing units or other computing devices.

In some examples, the server 102 includes at least one processor 108, a memory area 110 associated with a memory storage device 124, and at least one user interface component 112. The processor 108 includes any quantity of processing units, and is programmed to execute computer executable program code 104 for implementing aspects of the disclosure. The computer executable program code 104 may be performed by the processor 108 or by multiple processors within the server 102, or performed by a processor external to the server 102. In some examples, the processor 108 is programmed to execute computer executable program code 104 such as those illustrated in the figures (e.g., FIG. 9 and FIG. 10).

The server 102 further has one or more computer readable media such as the memory area 110. The memory area 110 includes any quantity of media associated with or accessible by the server 102. The memory area 110 may be internal to the server 102 (as shown in FIG. 1), external to the server (not shown), or both (not shown). In some examples, the memory area 110 includes read-only memory (ROM) and/or memory wired into a computing device.

The memory area 110 stores, among other data, the computer executable program code 104 and one or more application(s) 106. The application(s) 106, when executed by the processor 108, operate to perform functionality on the server 102. Exemplary application(s) 106 include, without limitation, mail server application programs, web services, address book services, messaging services, media services, location-based services, search programs, and the like. The applications may communicate with counterpart applications or services such as web services accessible via a network 126. For example, the applications may represent server-side applications executing in a cloud that corresponds to downloaded client-side services.

The server 102 may further include one or more computer executable components. Exemplary components include a communications interface component 114, an application programming interface (API) component 116, and a system management component 118. In this example, components, such as communications interface component 114, API component 116, and system management component 118 are separate components from application(s) 106. However, in other examples, the communications interface component 114, API component 116, and system management component 118, are included within application(s) 106 of memory area 110.

API component 116, when executed, causes the processor to process REST API queries received from a client. The server returns a response to the client via the API component 116. In this non-limiting example, API component 116 is a representational state transfer (REST) API. However, the disclosure is not limited to implementation by a REST API.

REST API follows a client-server model, as shown in FIG. 1. A uniform interface separates clients and servers. This separation means that, for example, data storage typically remains internal to each server rather than on the client. This improves portability of client code.

REST API is stateless. Each request from a client includes the information necessary for the server to service the request. In other words, the necessary state to handle the request is included within the request itself, whether as part of the URI, query-string parameters, body, or headers.

The uniform resource identifier (URI) uniquely identifies the resource and the body contains the state (or state change) of that resource. After the server processes the request, the piece(s) of state data that matter are communicated back to the client via headers, status, and/or the response body.

In REST, the client includes all information needed by the server to fulfill the request within the request message itself. For example, a client may send a GET request specifying one or more properties of one or more instances of an object. An exemplary client request for values of two fields of a POOL object is as follows:
GET https://10.108.49.209/api/types/pool/instances?
fields=sizeTotal,sizeUsed.

This GET request includes two properties within a property field parameter, 'sizeTotal" and "sizeUsed". This exemplary request may be issued by a client to request the object properties "sizeTotal" and "sizedUsed" for a POOL object. The property "sizeTotal" may represent the total size or total amount of storage associated with the POOL. The property "sizeUsed" may represent the amount of pool storage that has been used.

In some examples, the communications interface component 114 includes a network interface card and/or computer executable program code (e.g., a driver) for operating the network interface card. Communication between the server 102 and other devices, such as client 120 and client 122, may occur using any protocol or mechanism over any wired or wireless connection.

In some examples, the user interface component 112 includes a graphics card for displaying data to the user and receiving data from the user. The user interface component may also include computer executable program code (e.g., a driver) for operating the graphics card. Further, the user interface component 112 may include a display (e.g., a touch screen display or natural user interface) and/or computer executable program code (e.g., a driver) for operating the display.

Figure 3:
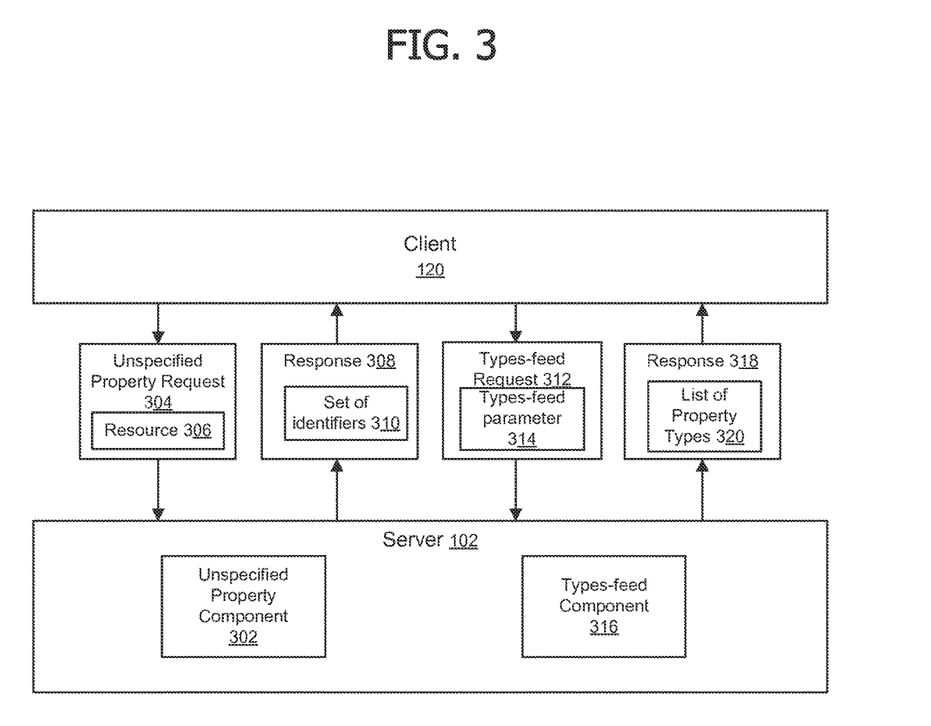
FIG. 3 is an exemplary block diagram illustrating a server responding to REST API queries.

The system management component 118 may execute within the server 102. The system management component 118 optionally manages resources associated with the server 102 and monitors the server 102. In some examples, the system management component 118 may include an unspecified property component 302 and/or a types-feed component 316 for managing unspecified property requests and types-feed requests.

In this example, the server 102 is connected via a network 126 to client 120 and client 122. The network 126 may include any type of network connection. In one example, the network 126 may be the Internet, an intranet, an Ethernet, or other wireless or hardwired connections by which the server 102 may send and receive data associated with one or more clients, such as, but without limitation, client 120 and/or client 122. However, other examples do not require a network 126.

Client 120 and client 122 represents any computing device executing instructions (e.g., as application programs, operating system functionality, or both) to implement the operations and functionality associated with the computing device. For example, client 120 may include a mobile computing device or any other portable device. In some examples, the mobile computing device includes a mobile telephone, laptop, tablet, computing pad, netbook, gaming device, and/or portable media player. The client 120 may also include less portable devices such as desktop personal computers, kiosks, tabletop devices, industrial control devices, wireless charging stations, and electric automobile charging stations. Additionally, the client 120 may represent a group of processing units or other computing devices.

In some examples, the client 120 includes one or more processor(s), a memory area, and at least one user interface. The processor includes any quantity of processing units, and is programmed to execute computer executable program code for implementing aspects of the disclosure. The instructions may be performed by the processor or by multiple processors within the client 120, or performed by a processor external to the client 120.

Client 120 stores one or more applications in a client memory area (not shown). The one or more applications may include an API (not shown) for sending page-to-identifier queries to the server 102. The API at the client may be a REST API.

Other exemplary client-side applications may include mail application programs, web browsers, calendar application programs, address book application programs, messaging programs, media applications, location-based services, search programs, and the like. The applications may communicate with counterpart applications or services associated with server 102, such as web services accessible via the network 126. For example, the applications may represent downloaded client-side applications that correspond to server-side services executing in a cloud.

In the example shown in FIG. 1, the system 100 includes a server 102, a network 126, client 120, and client 122. The system 100 may be implemented as a networked data processing system. However, the disclosure is not limited to a networked system including a server and multiple clients, as shown in FIG. 1.

In one example, the client 120 and server 102 may be implemented within a same computing device without a network connection. In another example, server 102 may be connected via a network to three or more client computing devices.

Figure 2:
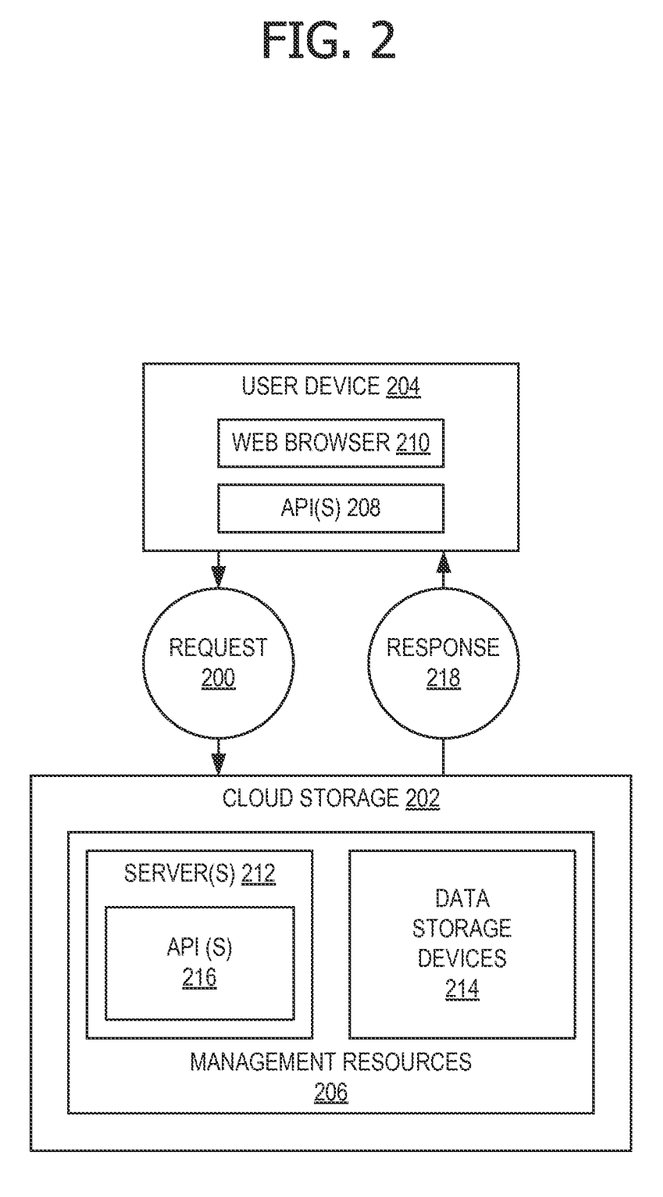
FIG. 2 is an exemplary block diagram illustrating an unspecified property request associated with a cloud storage system.

Referring now to FIG. 2, an exemplary block diagram illustrating an unspecified property request associated with a cloud storage system. Request 200 is an API request associated with one or more management resources 206 of cloud storage 202. The request 200 specifies a resource associated with management resources 206 but does not specify any properties. In other words, the request 200 fails to specify at least one property of the resource.

The user device generates the request 200 in accordance with one or more application programming interfaces (APIs) 208. In this example, the request 200 is a GET request in accordance with a REST API.

User device 204 may be any type of device capable of generating and sending a request and receiving a response 218 from cloud storage 202, such as, but not limited to, client 120 or client 122 in FIG. 1. For example, the user device 204 may be a desktop computer, a laptop computer, a tablet computer, a smart phone, or any other type of user device.

Cloud storage 202 is a data storage system including one or more management resources 206. The management resources 206 may include, for example and without limitation, one or more data storage device(s) 214, logical pools, logical units (LUNs), one or more server(s) 212, and any other hardware or software which may be associated with a cloud storage system.

The one or more data storage device(s) 214 includes at least one data storage device. In some embodiments, the one or more data storage device(s) 214 may include a data storage array. A data storage array includes a plurality of data storage devices. The data storage device(s) 214 may also include one or more types of data storage devices, such as, for example, one or more rotating disks drives and/or one or more solid state drives (SSDs).

The user device 204 may access cloud storage 202 resources and services via an application that utilizes the one or more API(s) 208, such as, but not limited to, a cloud storage gateway, a web-based content management system, or a web browser. For example, web browser 210 may generate and transmit the request 200 to cloud storage 202 via a web service API.

The one or more server(s) 212 receives the request 200 via one or more API(s) 216. In this non-limiting example, API(s) 216 includes a REST API. The one or more server(s) 212 processes the request 200 and generates the response 218 to the user device 204. The response 218 to the unspecified property request 200 includes one or more identifier value(s). This response 218 does not include any property values other than the identifier value(s).

Referring now to FIG. 3, an exemplary block diagram illustrating a server responding to REST API queries is depicted. In this example, the server 102 includes an unspecified property component 302. In some examples, the unspecified property component 302 is a software component associated with an API. In this non-limiting example, the unspecified property component 302 is in a component in accordance with a REST API. In some examples, the unspecified property component 302 may be associated with system management component 118.

The unspecified property component 302 provides a default response to requests. The default response returns an identifier of each instance to a client in response to any request that fails to identify at least one property in a property field of the request. The unspecified property component 302 processes the unspecified property request 304 to generate a response 308.

The unspecified property request, in some examples, is a GET request associated with a REST API. However, in other examples the unspecified property request 304 is not a GET request. For example, in some examples, the unspecified property request 304 may be a POST request. A response to the POST request includes data associated with at least one resource.

In still other example, the request 304 may be a request in accordance with a non-REST API. A non-REST API may be any API that does not conform to a REST type of architecture.

The unspecified property request 304 includes a specification of a resource 306. The resource 306 may be any type of resource associated with server 102. For example, but without limitation, the resource 306 may be a disk resource, employee resource, pool resource, contacts resource, an account resource, logical unit (LUN) resource, file resource, or any other possible type of resource.

The unspecified property request 304 omits a property field parameter. In other words, the unspecified property request 304 does not specify any property of an object within the unspecified property request 304. The absence of any properties specified within the request indicates that the unspecified property request 304 should be processes in accordance with the unspecified property component 302.

In an absence of at least one property of an object specified within a property field parameter of a request, the unspecified property component 302 identifies each instance associated with the resource to form a set of one or more instances. The unspecified property component 302 then identifies a default property for each instance. The default property is an identifier property.

The unspecified property component 302 identifies the default identifier property for each instance in the set of one or more instances to form a set of identifiers 310. The set of identifiers 310 is a set of one or more identifiers. The set of identifiers 310 forms a response 308 to the unspecified property request 304.

The response 308 includes only the identifier property of each instance associated with the resource. This single identifier property is the only property returned within the response 308. No other property associated with any instance of an object is included within the response 308.

The server 102 returns the response 308, including the set of identifiers 310, to the client 120. More specifically, in this non-limiting example, the REST API returns the response 308 to the client 120. Thus, in this example, the REST API only returns the identifier property for the set of instances of a resource by default when a user does not specify which properties are wanted by the user.

In another example, if an unspecified property request specifying a disk resource in accordance with a REST API is:

GET /api/types/disk/instances, the response will return a set of identifiers for a set of instances associated with the disk resource. The set of identifiers will include one identifier for each instance in the set of instances. An example of a response to this request may be:

{"entries":[{"id":"disk_0"}, {"id":"disk_1"}]}.

This response includes an identifier for each of two disk instances. The two disk instances include disk_0 and disk_1. Thus, the default REST API response in this example only returns the identifier for each instance in response to the unspecified property request.

The server 102, in this example, also supports a types-feed request 312. A types-feed parameter 314 of a types-feed request 312 indicates a client request for all available property types associated with a particular resource. An exemplary types-feed request may include:

GET /api/types/disk.

This types-feed request is a GET request for all property types associated with a disk resource that are available and/or supported on the server 102. In response, the server 102 will return all available types of properties for the disk resource that may be requested by the user.

Types-feed component 316 is a component that processes types-feed requests, such as types-feed request 312. The types-feed component 316, in some examples, may be associated with system management component 118.

The types-feed component 316 generates a list of all the supported property types 320 associated with a resource to form a response 318 to the types-feed request 312. The server 102 returns the response 318 to the user device 204 and/or client 120. In particular, in this non-limiting example, the REST API associated with the server 102 returns the response 318 to the client 120.

In other examples, if a user wants to obtain properties other than the default identifier, the user specifies the desired properties in the request. For example, if a request associated with a disk resource specifies one or more properties in a property field parameter of the request, such as:
GET /api/types/disk/instances?fields=name,size,
the response will include the default set of identifiers and the specified properties. In the above example, the specified properties include a "name" property and a "size" property. A response to this request will return values for the specified properties and the default identifier property values. For example, the response may include:
{"entries":[{"id":"disk_0", "name":"DPE Disk 0", "size": 10000000000},
{"id":"disk_1". "name":"DPE Disk 1", "size": 20000000000}]}.
This response include a set of properties for disk_0 that includes the default identifier "disk_0", the name "DPE Disk_0" and the disk size "1000000000". The set of properties for disk_1 includes the default identifier "disk_1", the name "DPE Disk_1" and the disk size "20000000000." Thus, the default response of this REST API conserves memory and reduces waste by only returning data specifically requested by the user.

Figure 4:
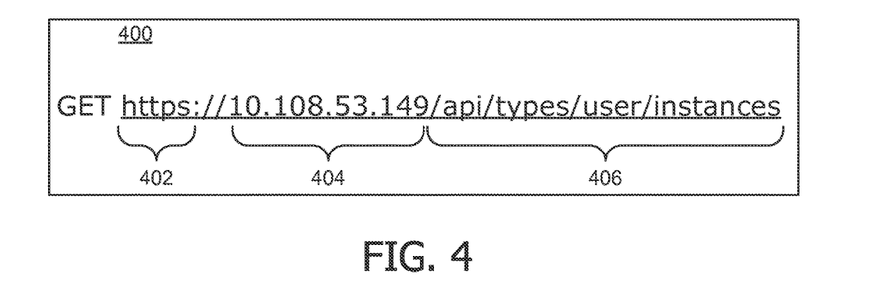
FIG. 4 is an exemplary unspecified property request.

Referring now to FIG. 4, an exemplary unspecified property request is shown. Request 400 provides an example of a uniform resource locator (URL) that may be sent from the client to the server in a GET request via a REST API. In this example, the request 400 is a REST API call asking for a list of all users on a system.

Element 402 of the request specifies a protocol used for the request. In this example, element 402 specifies a hypertext transfer protocol (HTTP) with the secure socket layer (SSL/transport layer security (TSL) protocol. The protocol provides encrypted communication and secure identification of a network web server. HTTPS signals the client browser to use an added encryption layer of SSL/TLS in connection with HTTP when communicating with a server, such as server 102, in order to retrieve a requested resource over the internet from the server.

HTTPS processing may be performed which includes server authentication. Thus, specifying that the server providing the resource(s) identified in request 400 should use HTTPS is one way of ensuring that the above-mentioned validation or verification of the server's identify is performed.

Element 404 specifies a server location. In this example, element 404 is an internet protocol (IP) address 404, such as, but not limited to, a web address for the server. In other examples, the server location may be specified using domain names and/or sub-domain names corresponding to an IP address. When using domain names, a domain name server resolves the server name to its IP address through a name resolution process using domain name server (DNS) tables.

Element 406 of request 400 identifies one or more resources. A resource may also be referred to as an object. In this example, "api/types/user/instances" identifies a user collection resource. Element 406 in this example specifies all user objects or instances. However, in other examples, element 406 may specify one or more resource objects, such as using unique resource object identifiers in element 406 of the request 400. For example, element 406 may include an identifier of a specific user resource rather than all users.

The request 400 does not include a property field parameter. In other words, the request 400 fails to specify at least one property of an object or instance. Therefore, this request is an unspecified property request, such as, but not limited to, unspecified property request 204 in FIG. 2.

Figure 5:
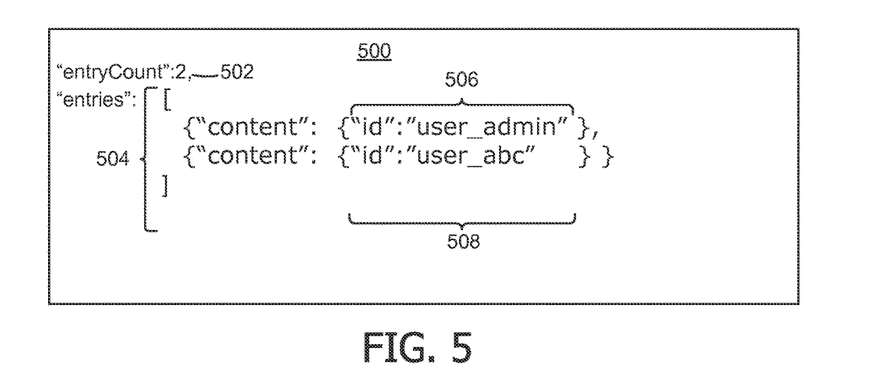
FIG. 5 is an exemplary response to an unspecified property request.

FIG. 5 is an exemplary response to an unspecified property request. Response 500 is a default response generated by an unspecified property component of a server in response to a request 400 for a list of all users on a system. Response 500 in this example is a response in accordance with the HTTP protocol or standard.

Element 502 is an entry count that indicates the number of instances of objects associated with the user resource that is included within the response. In other words, the entry count indicates how many instances have properties included within the response 500 returned to the client. There are only two users on this system, so the entry count is two.

Because the request 400 did not explicitly request any properties for the resource, element 504 of response 500 includes only the default object properties for the specified resource of the request. The only default property included with the default response 500 to the unspecified property request 300 is the identifier property for each user instance. In other words, default response to the unspecified property request 300 includes a set of one or more identifiers for each instance associated with the specified resource.

The response 500 excludes all properties associated with the specified resource, except the default identifier property. The default identifier property is the only property returned where a user fails to specify a property within a request, such as request 400.

In this example, the system only includes two users, a user administrator and a user "abc". In this example, element 504 includes a user administrator identifier "user_admin" 506 and a user "abc" identifier "user_abc" 508.

This example only includes two identifiers returned in the response 500. This example is only for illustrative purposes and is not limiting on other possible responses. Other example default responses may include any number of instance identifiers within a set of identifiers returned to the client for a particular resource. In other words, a default response to a non-specified property request may include a single instance identifier, two instance identifiers, as well as three or more instance identifiers.

The server only returns the identifier of each user in response to the unspecified property request. If the user associated with the client wants additional properties, other than the default identifier, the user must explicitly request the other properties the user is interested in receiving, as shown in FIG. 5 below. This default response saves on-array computer memory resources and network bandwidth.

Figure 6:
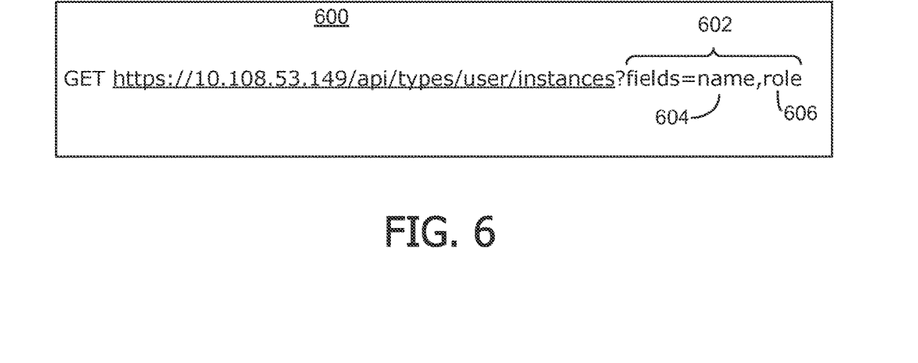
FIG. 6 is an exemplary GET request including two property field parameters.

Referring now to FIG. 6, an exemplary GET request including two property field parameters is depicted. Request 600 is a GET request conforming to REST API. The request 600 specifies two properties within the property field parameter 602 of the request 600. In this non-limiting example, the specified properties include a "name" property 604 and a "role" property 606 for each instance associated with the specified user resource. Therefore, this request is not an unspecified property request because two properties are included with the property field parameter of the request 600.

Figure 7:
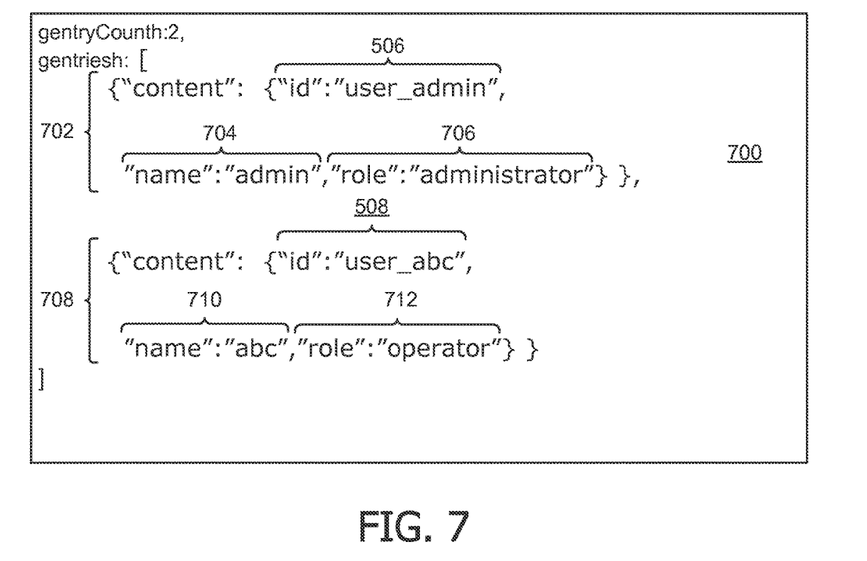
FIG. 7 is an exemplary response to a GET request including the two property field parameters.

FIG. 7 is an exemplary response to a GET request including the two property field parameters. Response 700 is a response to request 600 shown above. Element 702 includes the set of properties returned for the user administrator instance.

The set of properties associated with element 702 includes the user_admin identifier 506 of the user administrator instance, which is returned automatically as a default response. The default response of the REST API, in this example, always includes an identifier for each instance associated with the specified resource in the response.

In addition, the set of properties of element 702 also includes values for the two properties specifically requested by the user. In this case, the two properties were the "name" property 604 and the "role" property 606 specified in the request 600. Therefore, element 702 also includes a returned value of "admin" 704 for the name property of the user_admin instance and the value "administrator" 706 for the role property of the user_admin instance.

Element 708 includes a set of specified properties. The set of properties includes the user_abc identifier 508 of the "abc" user instance which is returned automatically as a default response. In addition, the set of properties of element 708 also includes the values "abc" 710 for the name property and the value "operator" 712 for the role property specified in request 600.

Figure 8:
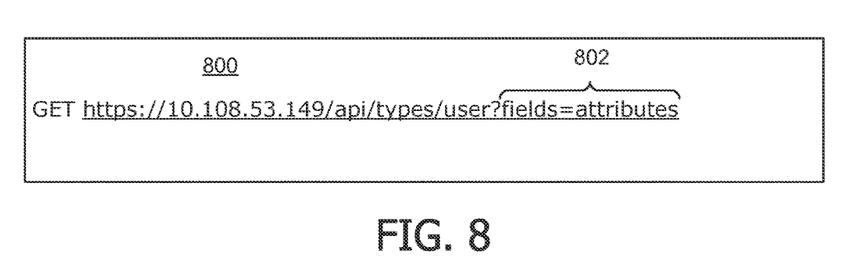
FIG. 8 is an exemplary types-feed request.

Referring now to FIG. 8, an exemplary types-feed request is depicted. Types-feed request 800 is a request for all available fields or properties associated with a particular resource. The types-feed request in this non-limiting example is a Get request in accordance with REST API.

This exemplary types-feed request 800 includes a types-feed parameter "fields=attributes" 802 requesting a list of all available and supported properties of a resource which may be requested by a user. A response to the types-feed request 800 will return a list of all available and supported properties of the user resource. Thus, a types-feed request enables a user to learn which fields or properties of an object are available and/or supported on the server.

Figure 9:
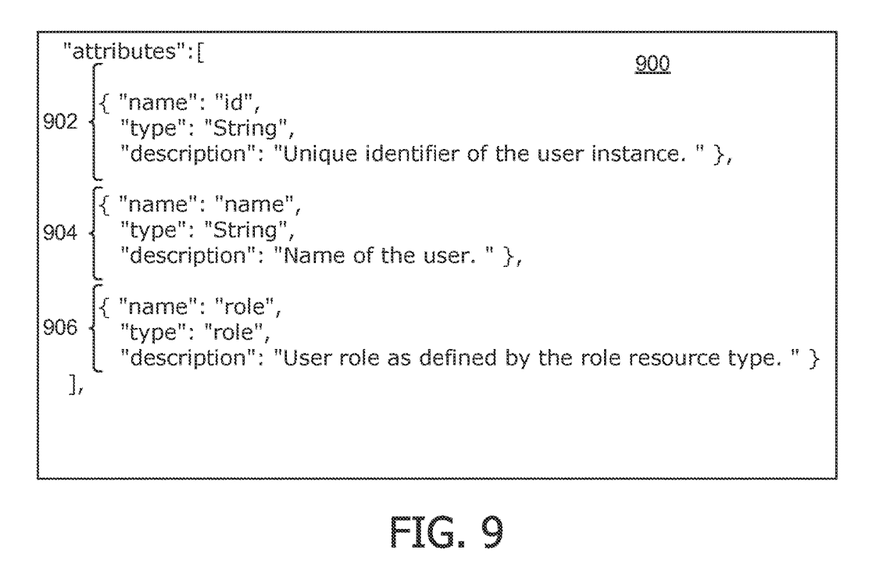
FIG. 9 is an exemplary response to a types-feed request.

FIG. 9 is an exemplary response to a types-feed request. Response 900 is a response to the types-feed request 800 requesting a list of all available properties for the user resource. In this non-limiting example, the list of supported properties includes three available properties, an identifier property 902, a name property 904, and a role property 906. The list of properties returned to the client may optionally include additional values describing each property in the list of properties. For example, the list of properties may include a "type" of the property, a "description" of the property, and/or other values describing each available property which may be requested by a user.

Figure 10:
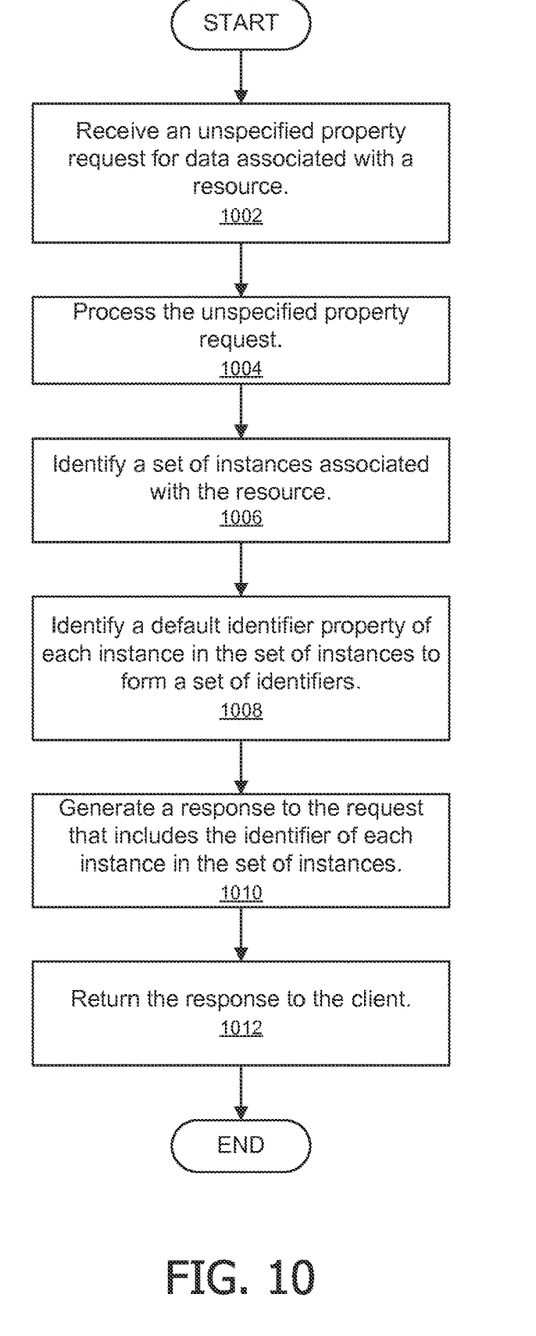
FIG. 10 is a flow chart illustrating operation of a computing device to return a response to an unspecified property request.

Referring now to FIG. 10, a flow chart illustrating operation of a computing device to return a response to an unspecified property request is shown. The process shown in FIG. 10 may be implemented by a computing device, such as, but without limitation, server 102 in FIG. 1. In some examples, an unspecified property component of a server, such as unspecified property component 302 in FIG. 3, may be executed to perform the process shown in FIG. 10.

The process begins by receiving an unspecified property request for data associated with a resource (operation 1002). The request is received from a client. The request omits a property field parameter.

The unspecified field request is processed (operation 1004). The process identifies a set of instances associated with the resource (operation 1006). The process identifies a default identifier property of each instance in the set of instances to form a set of identifiers (operation 1008). The process generates a response to the request that includes the set of identifiers (operation 1010). The process returns the response to the client (operation 1012) with the process terminating thereafter.

Figure 11:
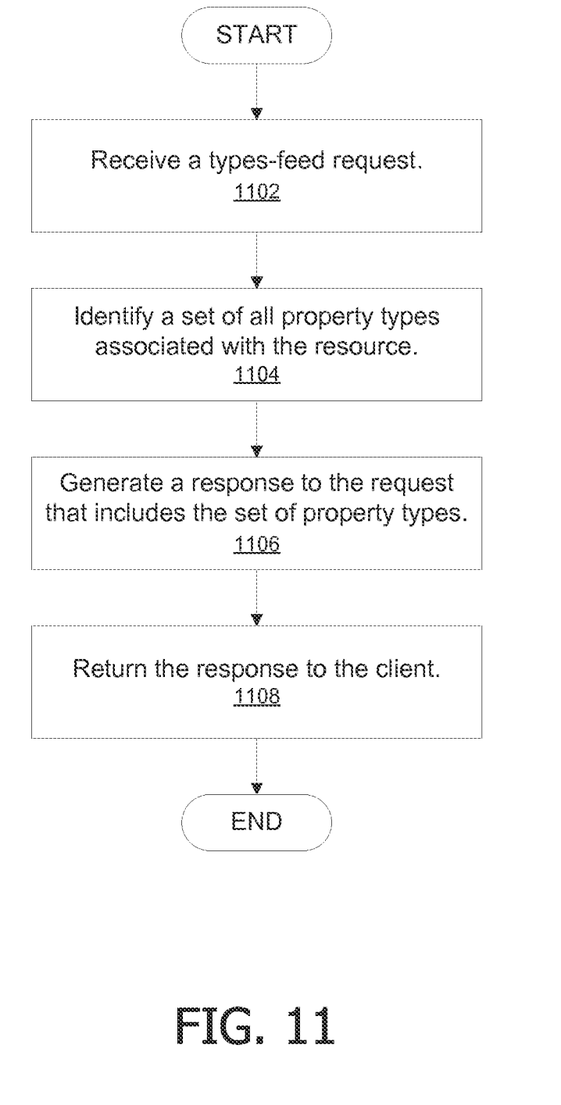
FIG. 11 is a flow chart illustrating an operation of a computing device to return a response to a types-feed request.

FIG. 11 is a flow chart illustrating an operation of a computing device to return a response to a types-feed request. The process shown in FIG. 11 may be implemented by a computing device, such as, but without limitation, server 102 in FIG. 1. In some examples, a types-feed component of a server, such as types-feed component 316 shown in FIG. 3, may be executed to perform the process shown in FIG. 11.

The process begins by receiving a types-feed request (operation 1102). The types-feed request includes an identification of a resource and a types-feed parameter requesting a list of available properties.

The process identifies a set of all property types associated with the resource (operation 1104). The set of all property types may be a list including each property that is available for a particular resource. The process generates a response including the set of all property types (operation 1106). The process returns the response to the client (operation 1108) with the process terminating thereafter.

In this manner, a user may determine which properties of an object may be requested by sending a types-feed request to the server. Therefore, although the default response for an unspecified property request is to only return the default identifier property, the user may utilize a types-feed request to obtain a listing of available properties that may be specifically requested in a GET request to the server. This improves system efficiency, reduces processor load, reduces network bandwidth usage, and improves user efficiency by only returning desired properties to the user.

In some examples, if a client sends a request to a server specifically requesting a property that is no longer available, the server will send an error message to the client. In an example scenario, if the client sends a request specifying a desired "name" property for a specific user resource wherein the user resource has been deleted from the server, the server will return an error to the client indicating the requested property is unavailable.

In other examples, if a client request does not specify a property of a resource that is unavailable, the unavailability of the unspecified property will not adversely affect the request. For example, if the user requests a "role" property for a specific user resource, but the request does not specify the deleted "name" property, the server will only return the default identifier properties for the resource and the specifically requested "role" property. The server will not return any un-specified properties of the resource. Therefore, the unavailability of the unspecified "name" property will not adversely impact the response to the request. In other words, the response in this example will not be affected by the error associated with the deleted "name" property.

In other examples, the server documents object dependencies explicitly within a set of queries received from a particular client. The set of queries is a set of one or more requests received from the client, such as, but not limited to, an unspecified property request or a request that includes one or more specified properties.

At least a portion of the functionality of the various elements in FIG. 10 and FIG. 11 may be performed by other elements in FIG. 1 and FIG. 2, or an entity (e.g., processor, web service, server, application program, computing device, etc.) not shown in FIG. 1 or FIG. 2.

In some examples, the operations illustrated in FIG. 10 and FIG. 11 may be implemented as software instructions encoded on a computer readable medium, in hardware programmed or designed to perform the operations, or both. For example, aspects of the disclosure may be implemented as a system on a chip (SoC) or other circuitry including a plurality of interconnected, electrically conductive elements.

While aspects of the disclosure have been described in terms of various examples with their associated operations, a person skilled in the art would appreciate that a combination of operations from any number of different examples is also within scope of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable program code, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable program code, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer executable program code, such as program modules, executed by one or more computers or other devices in software, firmware, hardware, or a combination thereof. The computer executable program code may be organized into one or more computer executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer executable program code or the specific components or modules illustrated in the figures and described herein. Other examples of the disclosure may include different computer executable program code or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein, but within the scope of aspects of the disclosure, constitute exemplary means for implementing REST API queries and query responses. For example, the elements illustrated in FIG. 1, such as when encoded to perform the operations illustrated in FIG. 9 and FIG. 10, constitute exemplary means for managing paginated data and exemplary means for responding to queries via an API.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A server, comprising:

at least one processor; and a memory storage device, the memory storage device comprising a memory area storing an unspecified property component, wherein the unspecified property component is configured to return only an identifier of each instance associated with a resource identified in an unspecified property request, wherein the at least one processor executes the unspecified property component to:

receive the unspecified property request for data associated with the identified resource from a client;

determine that the unspecified property request does not include a property field; and having determined that the unspecified property request does not include the property field:

identify a set of instances associated with the resource;

obtain the identifier of each instance in the set of instances to form a set of identifiers;

generate a default response to the unspecified property request in accordance with a representational state (REST) application programming interface (API), the default response comprising the set of identifiers and excluding all properties associated with the resource except the identifier of each instance in the set of instances; and
return the default response to the client,
wherein the memory area further stores a types-feed component, and
wherein the at least one processor executes the types-feed component to receive a types-feed request for the resource, the types-feed request comprising a request for all available property types associated with the resource.

2. The server of claim 1, wherein the default response is a first response and wherein the at least one processor further executes the types-feed component to:
generate a second response,
wherein the second response comprises a list of all property types associated with the resource; and
return the second response to the client.

3. The server of claim 1, wherein the unspecified property request is a first request, and further comprising:
a system management component,
wherein the at least one processor further executes the system management component to:
receive a second request for data associated with the resource from a client;
determine that the second request includes the property field comprising a first property of the resource and a second property of the resource, the property field within the second request expanding an amount of data returned to the client; and
return a second response to the client, the second response comprising a first value associated with the first property for each instance in the set of instances, a second value associated with the second property for each instance in the set of instances, and the set of identifiers for the set of instances.

4. The server of claim 3, wherein the at least one process further executes the computer executable code to:
return an error to the client indicating a requested property is unavailable on determining the second property for a given instance in the set of instances is unavailable.

5. The server of claim 3, wherein object dependencies are explicitly documented within source code.

6. The server of claim 1, wherein the unspecified property request is a GET request.

7. The server of claim 1, wherein the unspecified property request is a POST request, the default response to the POST request including the data associated with the identified resource.

8. A computer-implemented method for managing query responses by a computing device, comprising:
processing a first request for data associated with a resource by at least one processing device associated with a server;
determining, by an unspecified property component, that the first request does not include a property field; and
having determined that the first request does not include the property field:
obtaining, by the unspecified property component, an identifier of each instance in a set of instances of the resource to form a set of identifiers; and
generating a default response to the first request by the server, the default response comprising the set of identifiers and excluding all properties associated with the resource except the identifier of each instance in the set of instances;
receiving a second request comprising a types-feed parameter, the types-feed parameter comprising an identification of the resource;
generating a second response, by a types-feed component, the second response comprising a list of all available property types associated with the resource; and
returning the second response to the client.

9. The computer-implemented method of claim 8, wherein the first request is received from a client and further comprising:
returning the default response to the client via an application programming interface of a server.

10. The computer-implemented method of claim 9, wherein the application programming interface is a representational state transfer (REST) application programming interface.

11. The computer-implemented method of claim 8, further comprising:
receiving a third request for data associated with the resource from a client;
determining that the third request includes the property field comprising a first property of the resource and a second property of the resource, the property field within the third request expanding an amount of data returned to the client; and
returning a second response to the client, the second response comprising a first value associated with the first property for each instance in the set of instances, a second value associated with the second property for each instance in the set of instances, and a third value associated with the identifier of each instance in the set of instances.

12. The computer-implemented method of claim 11, further comprising:
receiving the first request from a client by a representational state transfer (REST) application programming interface (API) of a server.

13. The computer-implemented method of claim 11, further comprising:
upon determining that the second property for a given instance in the set of instances is unavailable, returning an error to the client indicating a requested property is unavailable.

14. The computer-implemented method of claim 8, wherein object dependencies are explicitly documented within source code.

15. One or more computer storage devices embodying computer executable components, said components comprising a systems management component that, when executed, cause at least one processor to:
receive a GET request for data associated with a resource from a client via a representational state (REST) application programming interface (API), the GET request comprising an identification of the resource;
determine that the GET request does not include a property field specifying a property associated with the resource; and
having determined that the GET request does not include the property field:
identify a set of instances associated with the resource;
obtain an identifier of each instance in the set of instances to form a set of identifiers; and
generate a default response to the client via the REST API, the default response comprising the set of identifiers and excluding all properties associated with the resource except the set of identifiers;

process a types-feed request received from a client, the types-feed request comprising the identification of the resource;

identify a set of properties associated with the resource;

generate a types-feed response, the types-feed response comprising the set of properties, the set of properties comprising all property types associated with the resource; and return types-feed response to the client.

16. The one or more computer storage devices of claim 15, wherein the systems management component is further executed to cause the at least one processor to:

receive a second GET request for data associated with the resource;

determine that the second GET request includes the property field comprising a first property of the resource and a second property of the resource; and return a second response to the client, the second response comprising the set of identifiers and further comprising:
  a first value associated with the first property for each instance in the set of instances, and
  a second value associated with the second property for each instance in the set of instances.

17. The one or more computer storage devices of claim 16 wherein object dependencies are explicitly documented within source code.

18. The server of claim 1, wherein the at least one processor further executes the unspecified property component, having determined that the unspecified property request does not include the property field, to generate the default response, the default response including (i) an entry count indicating a total number of instances in the set of instances, and (ii) a list of the instances in the set of instances, the list having a number of entries equal to the total number of instances, each of the entries in the list including the identifier of a respective instance in the set of instances.

19. The server of claim 2, wherein the at least one processor further executes the types-feed component to generate the second response, the second response including the list of all property types associated with the resource, the list having a number of entries equal to a total number of the property types, each of the entries in the list including at least a name of a respective property, a type of the respective property, and a description of the respective property.

20. The server of claim 3, wherein the at least one processor further executes the system management component to generate the second response, the second response including (i) an entry count indicating a total number of instances in the set of instances, and (ii) a list of the instances in the set of instances, the list having a number of entries equal to the total number of instances, each of the entries in the list including (i) the identifier of a respective instance in the set of instances, (ii) the first value associated with the first property of the respective instance in the set of instances, and (iii) the second value associated with the second property of the respective instance in the set of instances.

* * * * *